(12) United States Patent
Goto et al.

(10) Patent No.: US 6,575,633 B2
(45) Date of Patent: Jun. 10, 2003

(54) HYDRAULIC BEARING MOTOR

(75) Inventors: Hiromitsu Goto, Chiba (JP); Shinji Kinoshita, Chiba (JP); Toru Kumagai, Chiba (JP); Yukihiro Nakayama, Chiba (JP); Chihiro Tazawa, Chiba (JP); Mitsuharu Iwamoto, Chiba (JP); Ryoji Yoneyama, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/996,828

(22) Filed: Nov. 29, 2001

(65) Prior Publication Data

US 2002/0081045 A1 Jun. 27, 2002

(30) Foreign Application Priority Data

Nov. 30, 2000 (JP) .......................... 2000-365590

(51) Int. Cl.$^7$ ............................... F16C 32/06
(52) U.S. Cl. ........................ 384/107; 384/112
(58) Field of Search ................. 384/107, 112, 384/121, 123, 114

(56) References Cited

U.S. PATENT DOCUMENTS

| 6,036,368 | A | * | 3/2000 | Takehara et al. | ............ 384/112 |
| 6,252,322 | B1 | * | 6/2001 | Kawawada et al. | ......... 384/107 |
| 6,307,293 | B1 | * | 10/2001 | Ichiyama | .................... 384/123 |
| 6,354,742 | B1 | * | 3/2002 | Iwaki et al. | ................ 384/107 |

* cited by examiner

Primary Examiner—Thomas R. Hannon
(74) Attorney, Agent, or Firm—Adams & Wilks

(57) ABSTRACT

In a hydraulic bearing motor, by means of dynamic pressure generating grooves provided on a thrust shaft with a larger diameter not only on the end face thereof but also on the shaft surface thereof, pressures generated in oil when rotating a shaft body are made to be applied not only in the axial direction but also in the radial direction with high magnitude. This can provide the hydraulic bearing motor as being capable of satisfying features of exhibiting small NRRO, and vibration and shock resistance even with a thinned hydraulic bearing motor.

10 Claims, 8 Drawing Sheets

SURFACE WITHOUT DYNAMIC PRESSURE GENERATING GROOVES

SURFACE WITH DYNAMIC PRESSURE GENERATING GROOVES
($2a \geq b, 3c \leq d$)

HYDRAULIC BEARING MOTOR

BACKGROUND OF THE INVENTION

1. Field of the Invention

The present invention relates to a hydraulic bearing motor, and particularly to a hydraulic bearing motor which, even though it is formed thin, can still satisfy features of exhibiting small NRRO, and vibration and shock resistance.

2. Description of the Related Art

In general, a bearing of a mass produced motor has a structure of supporting a motor shaft by using ball bearings. In such a bearing, however, steel balls as ball bearings, being in a state of rotating on a shaft or a support in principle, tend to generate noise. In particular, in an information home appliance mounted with an HDD (hard disk drive) recently becoming denser, a motor for driving the HDD at a higher speed generates larger noise from the bearing to cause a noise problem. Moreover, a bearing using the ball bearing tends to cause a large NRRO (non-resonant rotary oscillation) This causes read/write error in an HDD becoming denser.

Therefore, in recent years, development work is increasing about a bearing known as a hydraulic bearing (or a dynamic pressure bearing) in which oil is used as a lubricant. In the hydraulic bearing, a lubricating oil filling a space between a shaft and a sleeve (a supporter of the shaft) provides a rotation without causing the both to contact with each other. This hardly produces noise in principle with a trace of the rotating shaft being almost round to cause a considerably smaller NRRO compared with that of the bearing with the ball bearings.

Figure 1:
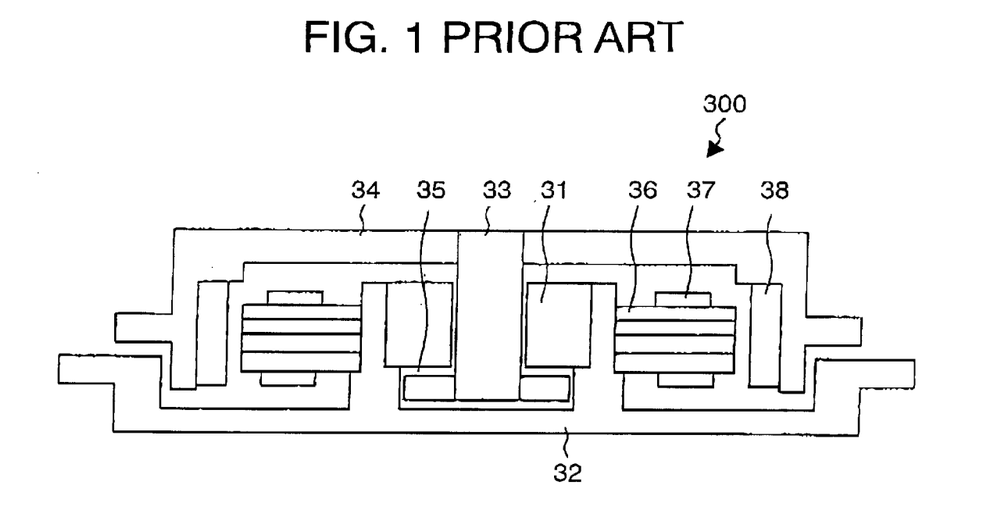
FIG. 1 is a cross sectional view showing a principal part of a related hydraulic bearing motor with a bearing known as an inverted T type.
Figure 2:
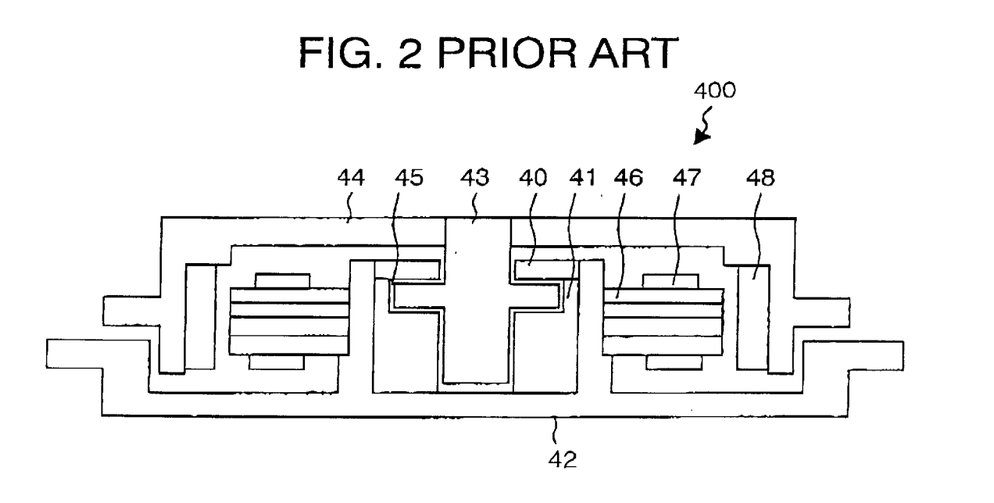
FIG. 2 is a cross sectional view showing a principal part of another related hydraulic bearing motor with a bearing known as a T type.

FIG. 1 and FIG. 2 are cross sectional views each showing a principal part of a related hydraulic bearing motor. In FIG. 1, there is shown a bearing known as an inverted T type and in FIG. 2, there is shown a bearing known as a T type.

The hydraulic bearing motor 300 shown in FIG. 1 is provided with a hydraulic bearing assembled with the following being taken as prime components, a sleeve (a support) 31 formed with a cylindrical shaft body inserting hole, a frame 32 securing the lower side of the sleeve 31, a cylindrical shaft body 33 having a cross sectional form of an inverted T and being inserted into a space formed by the shaft body inserting holes the sleeve 31 and the frame 32, with a clearance being created between the shaft body 33 and inner walls of the sleeve 31 and the frame 32, a hub 34 securely mounted on an upper portion of the shaft body 33, and oil 35 filling the above clearance. In addition, the hydraulic bearing motor 300 comprises a core 36 laminated with steel plates disposed on the periphery of the sleeve 31, a coil 37 wound onto the core 36, and a magnet 38 mounted on the hub 34 and positioned so as to face the core 36 and the coil 37 the hydraulic bearing motor 300 functions so that a varying magnetic field generated by the core 36 and the coil 37 acts on the magnet 38 to rotate the hub 34 with resulting rotation of the shaft body 33.

In the hydraulic bearing, when the shaft body 33 is in rotation, a pressure is generated in the oil 35. The generated pressure keeps the shaft body 33 away from the sleeve 31 side for rotation. The pressure is generated by dynamic pressure generating grooves formed on the surface of the shaft body 33. The groove is generally known as a herringbone, by which fluid flows therein for being gathered to increase a pressure of the fluid. The fluid with an increased pressure is then made to flow out from the groove to generate a dynamic pressure. The rotated shaft body 33 itself makes the fluid flow in the dynamic pressure generating groove from an entrance side thereof.

The dynamic pressure generating grooves maybe classified into grooves provided on a surface of a radial shaft for gathering the fluid to generate a pressure in the radial direction, and grooves provided on an end face of a thrust shaft for gathering the fluid to generate a pressure in the axial direction of the radial shaft perpendicular to the radial direction. A section of the shaft body inserting hole by which the radial shaft is supported is called as a radial bearing section, and a section of the shaft body inserting hole by which the thrust shaft is supported is called as a thrust bearing section. Here, the thrust bearing section is shown as a region surrounded by the sleeve 31 and the frame 32. Namely, the radial shaft and the thrust shaft are separately provided on the shaft body 33 with dynamic pressure generating grooves for generating dynamic pressures formed on the respective shafts.

On the radial bearing section side, there is provided a function of supporting the shaft body 33 against whirling and a moment thereof being generated. While, on the thrust bearing section side, there is provided a function of supporting a load (disks) stacked on the hub 34 with the centers of the load and the hub 34 on the same axis.

The hydraulic bearing motor 400 shown in FIG. 2 is provided with a hydraulic bearing assembled with the following being taken as prime components, a doughnut-like upper plate 40, a sleeve (a support) 41 formed with a cylindrical shaft body inserting hole having a cross sectional form of inverted T for fitting the upper plate 40, a frame 42 securing the lower side of the sleeve 41, a cylindrical shaft body 43 having a cross sectional form of a cruciform shape and being inserted into a space formed by the upper plate 40, the shaft body inserting hole of the sleeve 41 and the frame 42 with a clearance being created between the shaft body 43 and inner walls of the upper plate 40, the sleeve 41 and the frame 42, a hub 44 securely mounted on an upper portion of the shaft body 43, and oil 45 filling the above clearance. In addition, the hydraulic bearing motor 400 comprises a core 46 laminated with steel plates disposed on the periphery of the sleeve 41, a coil 47 wound onto the core 46, and a magnet 48 mounted on the hub 44 and positioned so as to face the core 46 and the coil 47. The hydraulic bearing motor 400 functions so that a varying magnetic field generated by the core 46 and the coil 47 acts on the magnet 48 to rotate the hub 44 with resulting rotation of the shaft body 43. Also in the hydraulic bearing motor 400, a radial shaft and a thrust shaft are separately provided on the shaft body 43 with dynamic pressure generating grooves for generating dynamic pressures formed on the respective shafts.

In recent years, development is being carried out for mounting the HDD not only on a personal computer but also on a portable information device so that the device is to become multimedia equipment. The portable information device as a target of the development, in order to be provided as being lightweight and compact, requires the HDD to be also provided as being lightweight and compact. In particular, for improving portability, it is also required that the hydraulic bearing motor itself is to be made thin.

In the related hydraulic bearing motors, however, the radial shaft and the thrust shaft were designed and manufactured on condition that they are separately provided. This required a radial shaft to have a certain specified length, so that the radial shaft had a limitation in being made thin. Namely, shortened radial shaft becomes incapable of providing a stiffness for suppressing whirling of the radial shaft. Therefore, in the related hydraulic bearing motor, there was a problem in that it is impossible to satisfy features of exhibiting small NRRO, and vibration and shock resistance while satisfying requirement of making the motor thin.

Accordingly, the present invention was made in view of the foregoing with an object of providing a hydraulic bearing motor that can satisfy features of exhibiting small NRRO, and vibration and shock resistance even when being provided as a thin hydraulic bearing motor.

SUMMARY OF THE INVENTION

In order to achieve the above object, the hydraulic bearing motor according to the present invention is characterized by a constitution wherein, in a hydraulic bearing motor comprising:

a shaft body having a radial shaft and a thrust shaft, the radial shaft having a plurality of dynamic pressure generating grooves being formed on an shaft surface for gathering fluid to generate a dynamic pressure in a radial direction of the shaft body, the thrust shaft having a plurality of dynamic pressure generating grooves being formed on an shaft end face for gathering fluid to generate a dynamic pressure in an axial direction of the shaft body, and the shaft body being rotated in a specified direction with the fluid made flow in the dynamic pressure generating grooves; and a shaft supporting member having a radial bearing section and a thrust bearing section, the radial bearing section supporting the radial shaft with a specified clearance being created between the shaft surface of the radial shaft and an inner wall of the radial bearing section, and the thrust bearing section supporting the thrust shaft with a specified clearance being created between the shaft end face and an inner wall of the thrust bearing section and between the shaft surface of the thrust shaft and an inner wall of the radial shaft supporting section, the shaft surface of the thrust shaft is also formed with a plurality of dynamic pressure generating grooves for generating a dynamic pressure in a radial direction in the thrust bearing section.

It is preferable that the dynamic pressure generated in the radial direction between the thrust shaft and the inner wall of the thrust bearing section is equal to a pressure which can support whirling of the shaft body and magnitude of an applied load, and the dynamic pressure generated in the radial direction between the radial shaft and the inner wall of the radial bearing section is enough to avoid contact between the radial bearing section and the shaft body.

DESCRIPTION OF THE PREFERRED EMBODIMENTS

Figure 3:
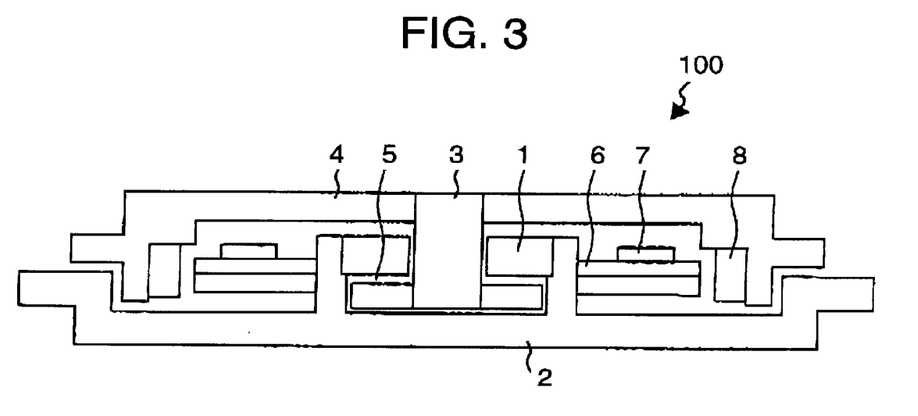
FIG. 3 is a cross sectional view showing a principal part of a first embodiment of a hydraulic bearing motor according to the present invention with a bearing known as an inverted T type.

In the following, preferred embodiments of the present invention will be explained in detail with reference to the drawings. It is, however, to be understood that the present invention is not limited by the embodiments.
First Embodiment FIG. 3 is a cross sectional view showing a principal part of a first embodiment of a hydraulic bearing motor according to the present invention. A bearing of the hydraulic bearing motor shown in FIG. 3 is that known as an inverted T type.

The hydraulic bearing motor 100 shown in FIG. 3 is provided with a hydraulic bearing assembled with the following being taken as prime components, a sleeve (a support) 1 formed with a cylindrical shaft body inserting holes a frame 2 securing the lower side of the sleeve 1, a cylindrical shaft body 3 having a cross sectional form of an inverted T and being inserted into a space formed by the shaft body inserting hole, the sleeve 1 and the frame 2, with a clearance being created between the shaft body 3 and an inner walls of the sleeve 1 and the frame 2, a hub 4 securely mounted on an upper portion of the shaft body 3, and oil 5 filling the above clearance.

In addition, the hydraulic bearing motor 100 comprises a core 6 laminated with steel plates disposed on the periphery of the sleeve 1, a coil 7 wound onto the core 6, and a magnet 8 mounted on the hub 4 and positioned so as to face the core 6 and the coil 7. The hydraulic bearing motor 100 functions so that a varying magnetic field generated by the core 6 and the coil 7 acts on the magnet 8 to rotate the hub 4 with resulting rotation of the shaft body 3.

Figure 4:
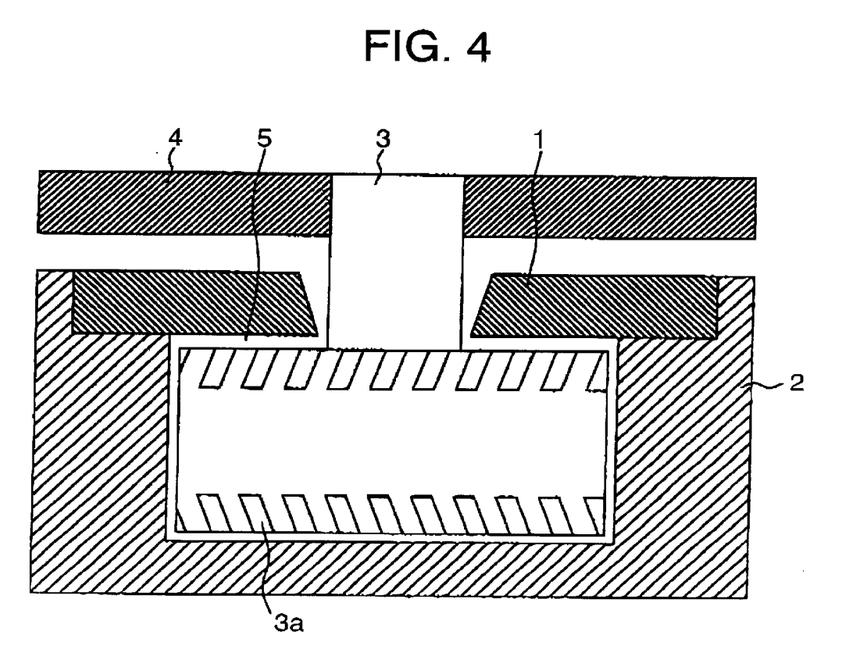
FIG. 4 is a diagram illustrating a hydraulic bearing section of the hydraulic bearing motor shown in FIG. 3.

FIG. 4 is a diagram illustrating a hydraulic bearing section of the hydraulic bearing motor 100 shown in FIG. 3. In the hydraulic bearing, when the shaft body 3 is in rotation, a pressure is generated in the oil 5. The pressure generated at this time is applied high by dynamic pressure generating grooves 3a provided on a shaft surface of a thrust shaft not only in the axial direction of the thrust shaft but also in a radial direction thereof. Here, the thrust shaft, having a larger diameter than that of the radial shaft, can be formed with the dynamic pressure generating grooves 3a for generating dynamic pressure in the radial direction with the number more than that of the grooves provided only on the shaft surface of the radial shaft. Thus, even though the radial shaft is made shortened than the related one and the number of the dynamic pressure generating grooves is reduced by shortening the radial shaft, the dynamic pressure generating grooves can be provided on the shaft surface of the thrust shaft having a length shorter than the shortened length of the radial shaft by the number reduced from the radial shafts. Therefore, by forming dynamic pressure generating grooves for generating a dynamic pressure acting in the radial direction also on the shaft surface of the thrust shaft, it becomes possible to make the hydraulic bearing motor 100 thin. Also in this case, fluid is made flow in the dynamic pressure generating grooves by the rotation of the shaft body 33 itself like in the related hydraulic bearing motor.

On the side of the thrust bearing section, it is preferable to generate a dynamic pressure by a magnitude for supporting the shaft body 3 against whirling and a moment (magnitude of a load). In this case, although not shown, there are also formed dynamic pressure generating grooves on the shaft surface on the side of the radial shaft. The dynamic pressure generating grooves on the side of the radial shaft must be provided with the number for generating a pressure enough to prevent the radial bearing section and the shaft body 3 from contacting with each other.

Figure 5:
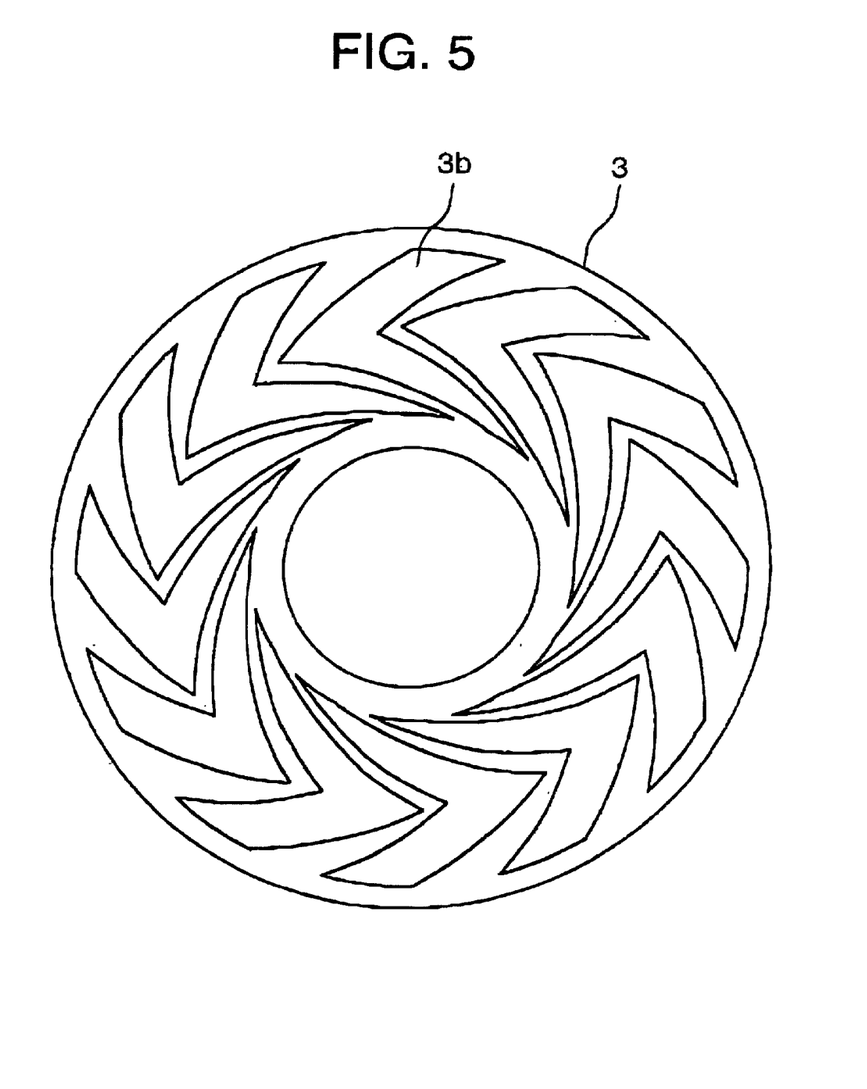
FIG. 5 is a plan view showing an end face of a shaft body on a thrust shaft side in the first embodiment.

FIG. 5 is a plan view showing an end face of a shaft body on a thrust shaft side. As shown in FIG. 5, like the shaft body in the related art, a dynamic pressure in the axial direction of the thrust shaft is to be reasonably generated by the dynamic pressure generating grooves 3b.

Figure 6:
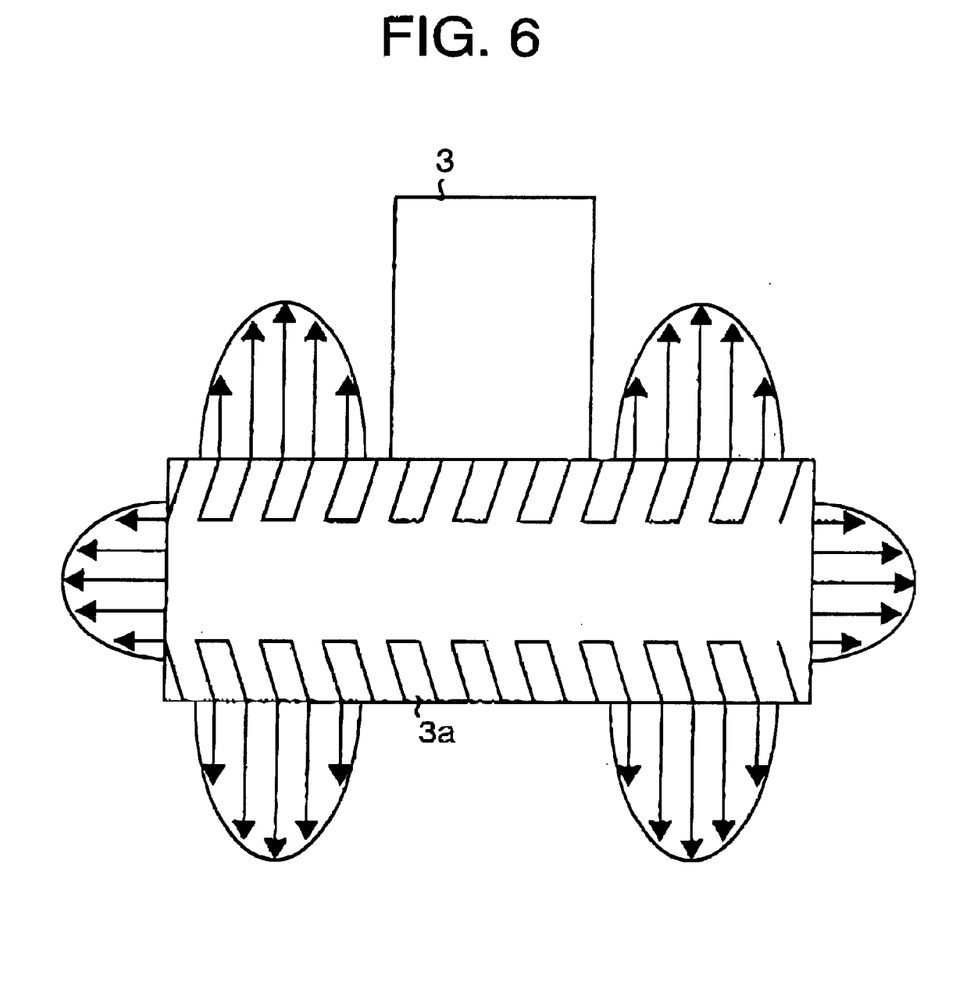
FIG. 6 is a conceptual illustration explaining distributions of dynamic pressure generated by a thrust shaft of the shaft body in the first embodiment.

FIG. 6 is a conceptual illustration explaining distributions of dynamic pressure generated by the thrust shaft of the shaft body 3. As shown in FIG. 6, it is apparent that high pressures are generated both in the axial direction and in the radial direction. It is preferable that the dynamic pressure generating grooves are formed so that the grooves generate a pressure pattern that provides the highest pressures on the peripheral side of the thrust shaft.

Figure 7:
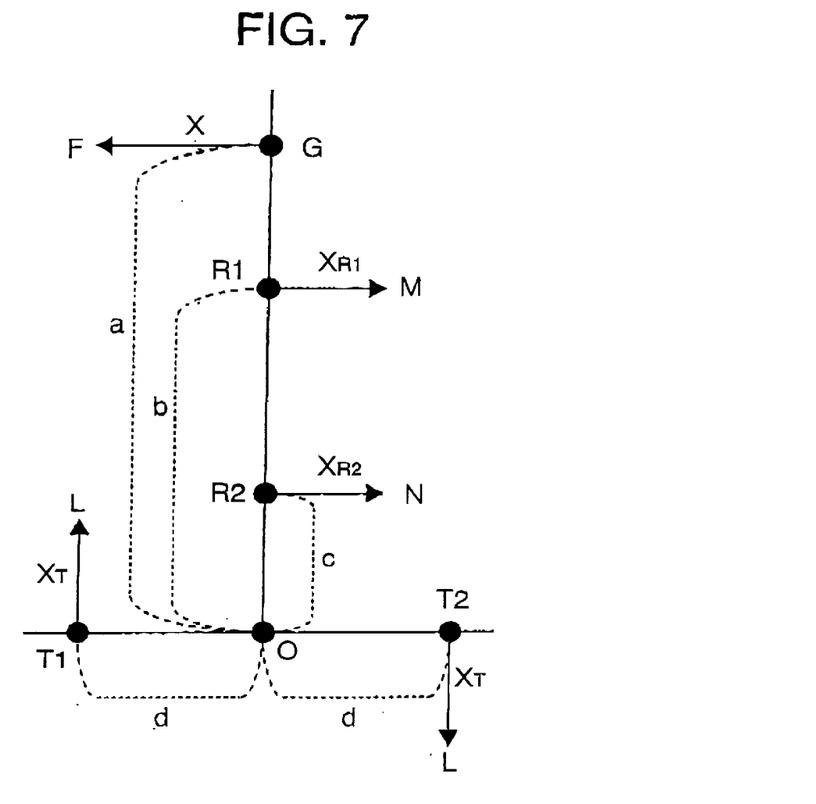
FIG. 7 is a conceptual illustration explaining an equilibrium state of forces in the shaft body brought by generated dynamic pressures.

FIG. 7 is a conceptual illustration explaining an equilibrium state of forces in the shaft body 3 brought by generated dynamic pressures. Here, G represents the position of the center of gravity when the hydraulic bearing motor 100 is loaded (with a disk). The diagram shows an equilibrium state when a force F is applied on the center of gravity to shift it by a displacement X. Furthermore, a point O represents the center of rotation. Each of points T1 and T2 represents a point of action of a dynamic pressure L generated by the thrust shaft and acting in the axial direction thereof (with a displacement XT). Points R1 and R2 represent points of action of a dynamic pressure M generated by the radial shaft and acting in the radial direction thereof (with a displacement XR1), and a dynamic pressure N generated by the thrust shaft and acting in the radial direction thereof (with a displacement XR2), respectively.

That is, when a load applies the force F which shifts the center of gravity g by the displacement X, the dynamic pressures M and N act so as to cancel the effect of the force F. Namely, the sum of a moment (the dynamic pressure M)×(a distance b from the point O) and a moment (the dynamic pressure N)×(a distance c from the point O) becomes in equilibrium with a moment (the force F)×(a distance a from the point O)

Figure 8:
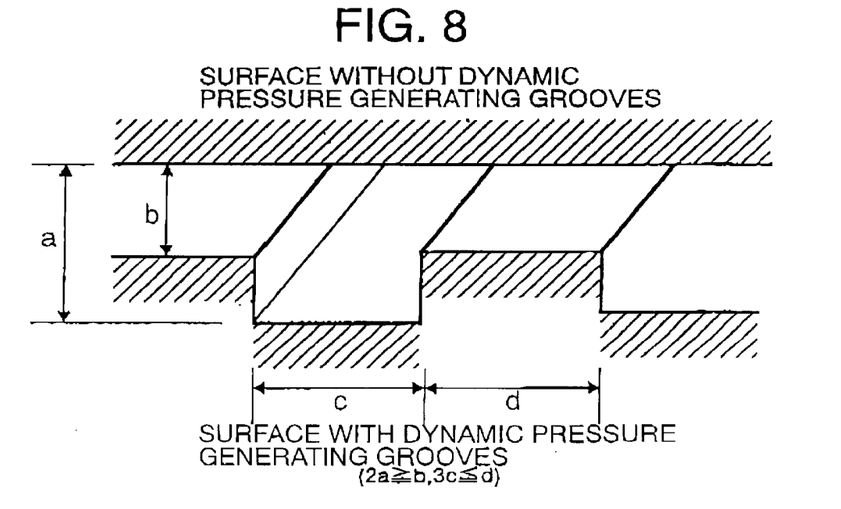
FIG. 8 is a perspective view illustrating a preferable relation between a surface with the dynamic pressure generating grooves and a surface without the dynamic pressure generating grooves.

FIG. 8 is a perspective view illustrating a preferable relation between a surface with the dynamic pressure generating grooves and a surface without the dynamic pressure generating grooves. As shown in FIG. 8, letting a, b, c, and d be a distance between the bottom of the dynamic pressure generating groove and a surface without the dynamic pressure generating grooves, a distance between a surface with the dynamic pressure generating grooves and the surface without the dynamic pressure generating grooves, a width of the dynamic pressure generating groove, and an interval between the dynamic pressure generating grooves, a high dynamic pressure is generated when relations of $2a \geq b$ and $3c \leq d$ hold.

Figure 9:
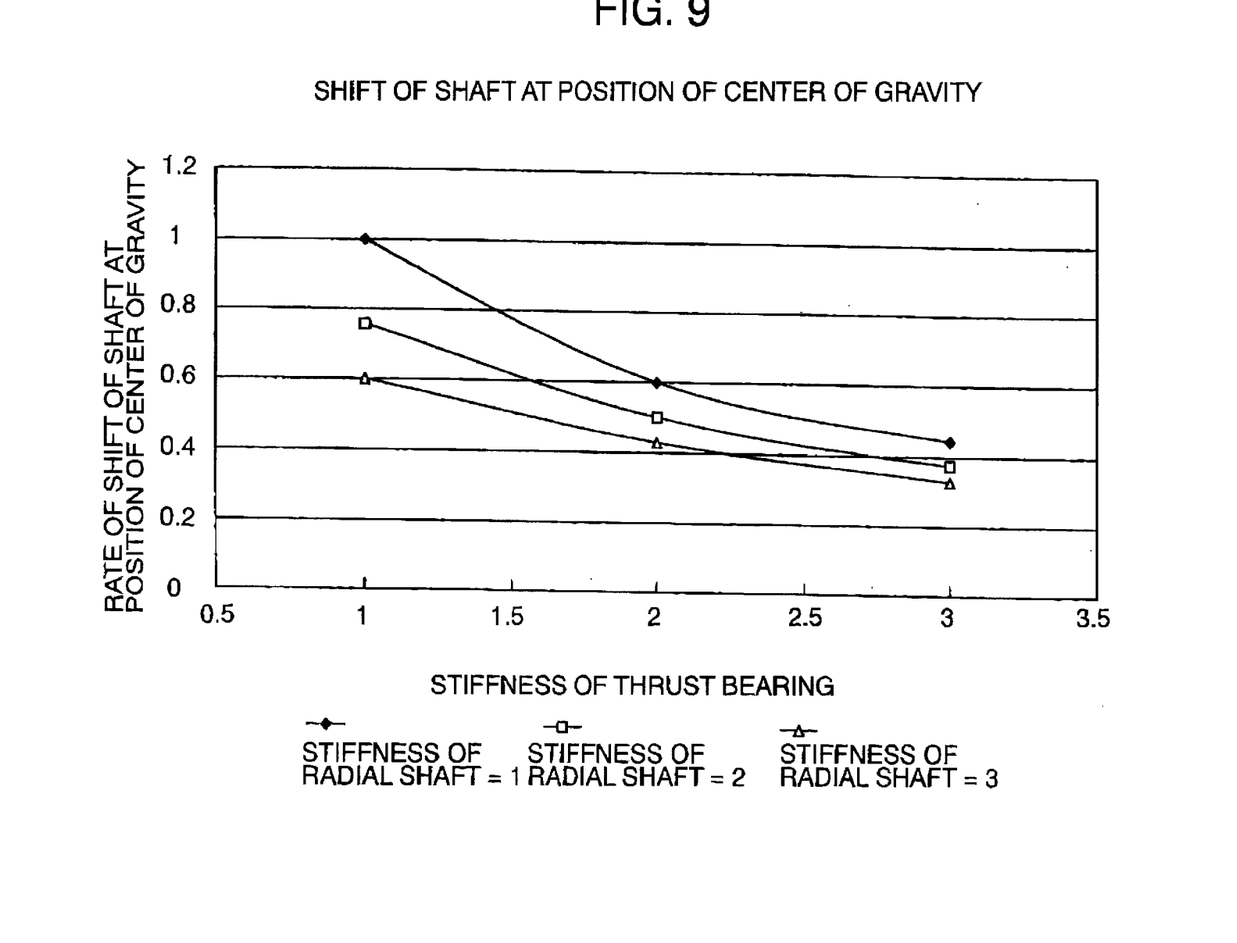
FIG. 9 is a graph showing a relation between a rate of shift of a shaft at the position of center of gravity and stiffness of the thrust bearing.

FIG. 9 is a graph showing a relation between a rate of shift of the shaft at the position of center of gravity and stiffness of the thrust bearing. Here, the stiffness is defined as a magnitude of the dynamic pressure acting so as to suppress the shift of the shaft. For comparison, the relation is shown about three kinds of rates of stiffness of radial shafts taken as parameters. The graph shows that change in stiffness of the thrust bearing can provide higher stiffness more efficiently than change in stiffness of the radial shaft. This means, as explained above, that the thrust shaft with a diameter being larger than the diameter of the radial shaft allows the dynamic pressure generating grooves to be formed thereon efficiently.

Therefore, according to the first embodiment, it becomes possible to provide the thrust bearing side a function of supporting the shaft body 3 against the whirling and the moment (magnitude of the load) thereof being generated, which function was provided on the radial bearing side in the related art. Therefore, compared with the related hydraulic bearing motor, features of exhibiting small NRRO, and vibration and shock resistance can be satisfied even with a thinned hydraulic bearing motor.

Second Embodiment

Figure 10:
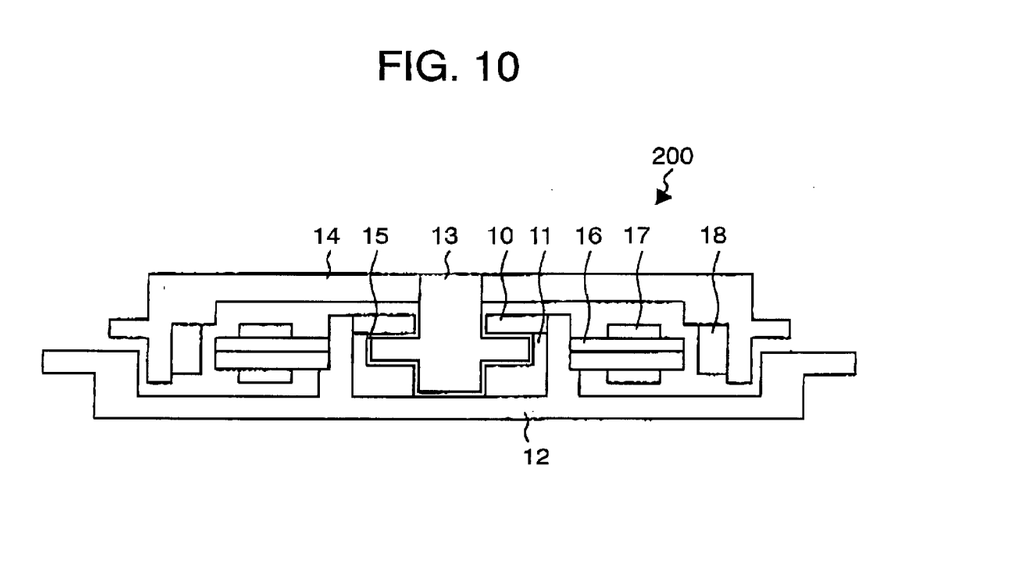
FIG. 10 is a cross sectional view showing a principal part of a second embodiment of a hydraulic bearing motor according to the present invention with a bearing known as a T type.

FIG. 10 is a cross sectional view showing a principal part of a second embodiment of a hydraulic bearing motor according to the present invention. A bearing of the hydraulic bearing motor 200 shown in FIG. 10 is that known as a T type. Although the bearing is seemingly no true T type in FIG. 10, it is taken as being the T type because dynamic pressure generating grooves for generating a dynamic pressure are formed on a portion with a T type cross sectional shape. When the dynamic pressure generating grooves are formed on a surface of a shaft with a cruciform cross sectional shape, the bearing is called as a cruciform type bearing. Therefore, here, what is shown in FIG. 10 is to be called as a modified T type.

The hydraulic bearing motor 200 shown in FIG. 10 is provided with a hydraulic bearing assembled with the following being taken as prime components, a doughnut-like upper plate 10, a sleeve (a support) 11 formed with a cylindrical shaft body inserting hole having a cross sectional form of a X shape for fitting the upper plate 10, a frame 12 securing the lower side of the sleeve 11, a cylindrical shaft body 13 having a cross sectional form of a cruciform shape and being inserted into a space formed by the upper plate 10, the shaft body inserting hole of the sleeve 11 and the frame 12 with a clearance being created between the shaft body 13 and inner walls of the upper plate 10, the sleeve 41 and the frame 12, a hub 14 securely mounted on an upper portion of the shaft body 13, and oil 15 filling the above clearance. In addition, the hydraulic bearing motor 200 comprises a core 161 aminated with steel plates disposed on the periphery of the sleeve 11, a coil 17 wound onto the core 16, and a magnet 18 mounted on the hub 14 and positioned so as to face the core 16 and the coil 17.

The hydraulic bearing motor 200 functions so that a varying magnetic field generated by the core 16 and the coil 17 acts on the magnet 18 to rotate the hub 14 with resulting rotation of the shaft body 13.

Figure 11:
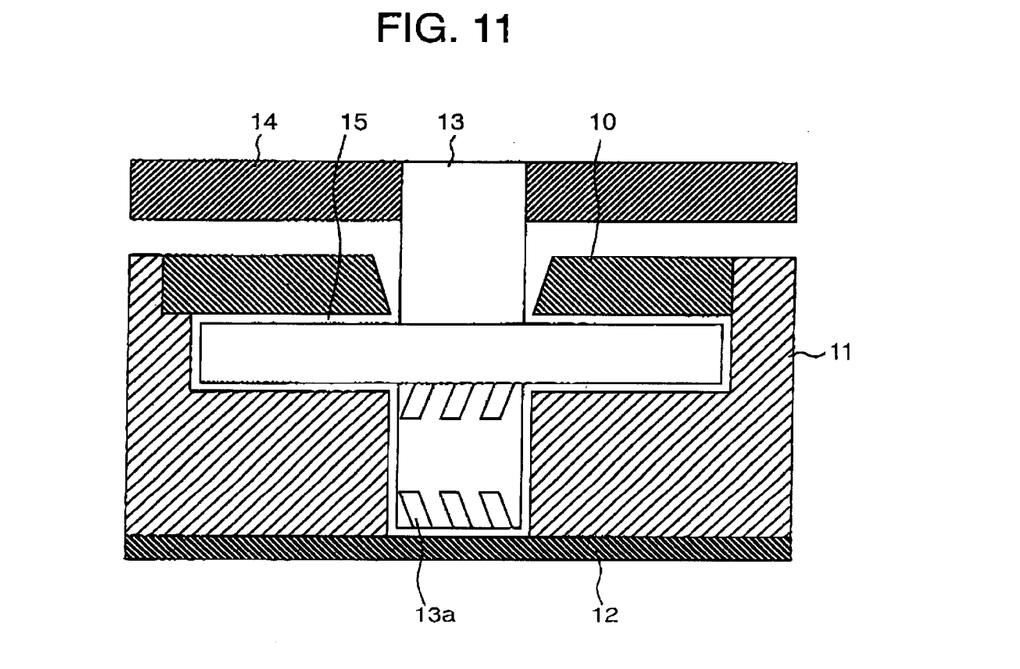
FIG. 11 is a diagram illustrating a hydraulic bearing section of the hydraulic bearing motor shown in FIG. 10.

FIG. 11 is a diagram illustrating a hydraulic bearing section of the hydraulic bearing motor 200 shown in FIG. 10. In the hydraulic bearing, when the shaft body 13 is in rotation, a pressure is generated in the oil 15. The pressure generated at this time is applied high by dynamic pressure generating grooves 13a provided on a shaft surface of a thrust shaft not only in the axial direction but also in the radial direction. Here, the thrust shaft, having a larger diameter than that of the radial shaft, can be formed with the dynamic pressure generating grooves 13a for generating dynamic pressure in the radial direction with the number more than that of the grooves provided only on the shaft surface of the radial shaft. Therefore, like in the above first embodiment, by forming dynamic pressure generating grooves for generating a dynamic pressure acting in the radial direction also on the shaft surface of the thrust shaft, it becomes possible to make the hydraulic bearing motor 200 thin. Also in this case, fluid is made flow in the dynamic pressure generating grooves by the rotation of the shaft body 13 itself like in the related hydraulic bearing motor.

Like in the above first embodiment, on the side of the thrust bearing section, it is preferable to generate a dynamic pressure by a magnitude for supporting the shaft body 13 against whirling and a moment (magnitude of a load). In this case, although not shown, there are also formed dynamic pressure generating grooves on the shaft surface on the side of the radial shaft. The dynamic pressure generating grooves on the side of the radial shaft must be provided with the number for generating a pressure enough to prevent the radial bearing section and the shaft body 13 from contacting with each other.

Figure 12:
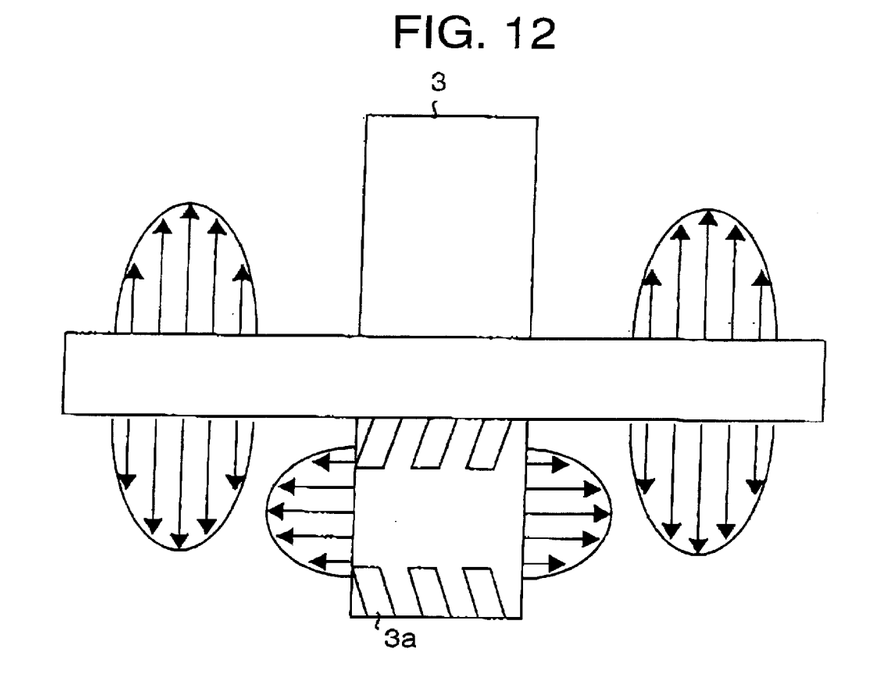
FIG. 12 is a conceptual illustration explaining distributions of dynamic pressure generated by a thrust shaft of the shaft body in the second embodiment.

FIG. 12 is a conceptual illustration explaining distributions of dynamic pressure generated by the thrust shaft of the shaft body 13 in the second embodiment. Like in the above first embodiment, it is apparent that high pressures are generated both in the axial direction and in the radial direction. It is preferable that the dynamic pressure generating grooves are formed so that the grooves generate a pressure pattern that provides the highest pressures on the peripheral side of the thrust shaft. The workings of the pressure distribution can be explained just as those in the above first embodiment.

Therefore, according to the second embodiment, like in the above first embodiment, it becomes possible to provide the thrust bearing side a function of supporting the shaft body 3 against the whirling and the moment (magnitude of a load) thereof being generated, which function was provided on the radial bearing side in the related art. Therefore, compared with the related hydraulic bearing motor, features of exhibiting small NRRO, and vibration and shock resistance can be satisfied even with a thinned hydraulic bearing motor.

Third Embodiment

Figure 13:
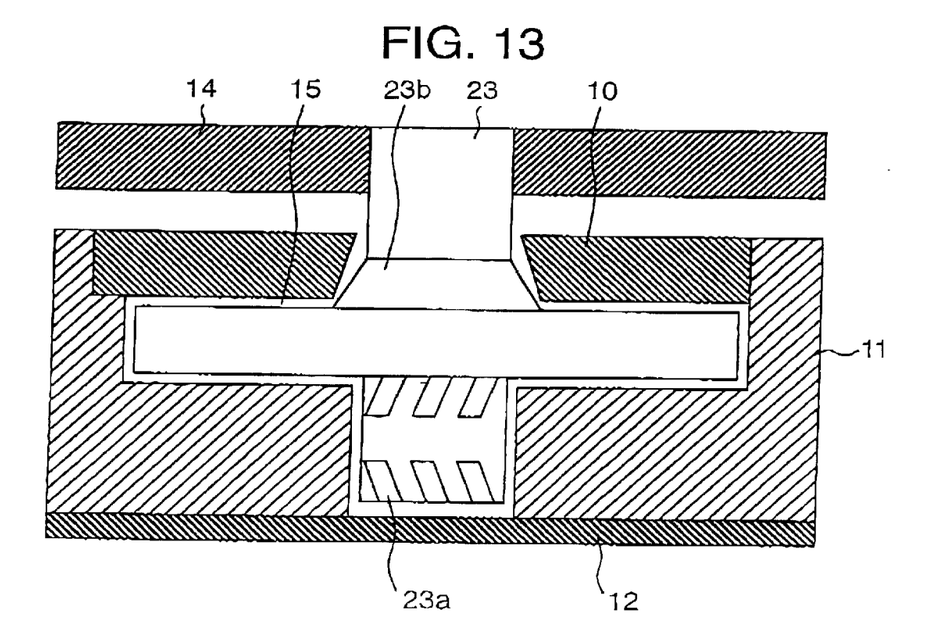
FIG. 13 is a cross sectional view illustrating a hydraulic bearing section of a third embodiment of a hydraulic bearing motor.

FIG. 13 is a cross sectional view illustrating a hydraulic bearing section of a third embodiment of a hydraulic bearing motor. The structure of the hydraulic bearing section of the hydraulic bearing motor shown in FIG. 13 is a modification of the structure of the hydraulic bearing section in the above second embodiment. Therefore, explanation will be made only about differences from the structure in the second embodiment. The constitution and workings of dynamic pressure generating grooves are similar to those in the above first embodiment.

In the hydraulic bearing, the upper plate 10 is mounted on the sleeve 11 as though the way of opening the through hole in the second embodiment is made upside down. Namely, the upper plate 10 is mounted on the sleeve 11 so that the through hole is narrowed upwardly. Moreover, a shaft body 23 is provided as being the one with a truncated cone section 23b formed on the thrust shaft of the shaft body 13 in the second embodiment.

Therefore, in the third embodiment, a clearance between the inner wall of the through hole of the upper plate 10 and the truncated cone section 23b is narrowed at an opening portion of the through hole. This can increase the pressure of the oil 15 in the axial direction of the thrust shaft. Therefore, together with workings and effect in the above second embodiment, there is offered an advantage which makes it possible to reduce the number or the sizes of dynamic pressure generating grooves for generating dynamic pressure in the axial direction.

As explained above, by the hydraulic bearing motor according to the present invention, an effect can be obtained which makes it possible to provide the thrust bearing side a function of supporting the shaft body against the whirling and the moment (magnitude of the load) thereof being generated, which function was provided on the radial bearing side in the related art. Therefore, compared with the related hydraulic bearing motor, features of exhibiting small NRRO, and vibration and shock resistance can be satisfied even with a thinned hydraulic bearing motor, by which an effect is also obtained that sakes it possible to increase a range of design choice.

What is claimed is:

1. In a hydraulic bearing motor comprising:
    a shaft body having a radial shaft and a thrust shaft, the radial shaft having a plurality of dynamic pressure generating grooves being formed on an shaft surface for gathering fluid to generate a dynamic pressure in a radial direction of the shaft body, the thrust shaft having a plurality of dynamic pressure generating grooves being formed on an shaft end face for gathering fluid to generate a dynamic pressure in an axial direction of the shaft body, and the shaft body being rotated in a specified direction with the fluid made flow in the dynamic pressure generating grooves; and
    a shaft supporting member having a radial bearing section and a thrust bearing section, the radial bearing section supporting the radial shaft with a specified clearance being created between the shaft surface of the radial shaft and an inner wall of the radial bearing section, and the thrust bearing section supporting the thrust shaft with a specified clearance being created between the shaft end face and an inner wall of the thrust bearing section and between the shaft surface of the thrust shaft and an inner wall of the radial shaft supporting section,
    the improvement wherein
        the shaft surface of the thrust shaft is also formed with a plurality of dynamic pressure generating grooves for generating a dynamic pressure in a radial direction in the thrust bearing section.

2. The hydraulic bearing motor according to claim 1, wherein the dynamic pressure generated in the radial direction between the thrust shaft and the inner wall of the thrust bearing section is equal to a pressure which can support whirling of the shaft body and magnitude of an applied load, and the dynamic pressure generated in the radial direction between the radial shaft and the inner wall of the radial bearing section is enough to avoid contact between the radial bearing section and the shaft body.

3. The hydraulic bearing motor according to claim 1, wherein the shaft body is of an inverted T type.

4. The hydraulic bearing motor according to claim 1, wherein the shaft body is of a cruciform type.

5. In a hydraulic bearing motor comprising:

a shaft body having a radial shaft and a thrust shaft, the radial shaft having a plurality of dynamic pressure generating grooves being formed on an shaft surface for gathering fluid to generate a dynamic pressure in a radial direction of the shaft body, the thrust shaft having a plurality of dynamic pressure generating grooves being formed on an shaft end face for gathering fluid to generate a dynamic pressure in an axial direction of the shaft body, and the shaft body being rotated in a specified direction with the fluid made flow in the dynamic pressure generating grooves; and a shaft supporting member having a radial bearing section and a thrust bearing section, the radial bearing section supporting the radial shaft with a specified clearance being created between the shaft surface of the radial shaft and an inner wall of the radial bearing section, and the thrust bearing section supporting the thrust shaft with a specified clearance being created between the shaft end face and an inner wall of the thrust bearing section and between the shaft surface of the thrust shaft and an inner wall of the radial shaft supporting section, the improvement wherein the plurality of the dynamic pressure generating grooves formed on the thrust shaft is generating higher dynamic pressure than the dynamic pressure generated by the plurality of the dynamic pressure generating grooves formed on the radial shaft.

6. The hydraulic bearing motor according to claim 5, wherein the dynamic pressure generated in the radial direction between the thrust shaft and the inner wall of the thrust bearing section is equal to a pressure which can support whirling of the shaft body and magnitude of an applied load, and the dynamic pressure generated in the radial direction between the radial shaft and the inner wall of the radial bearing section is enough to avoid contact between the radial bearing section and the shaft body.

7. The hydraulic bearing motor according to claim 5, wherein the shaft body is of an inverted T type.

8. The hydraulic bearing motor according to claim 5, wherein the shaft body is of a cruciform type.

9. In a method of driving a hydraulic bearing motor, the motor comprising:

a shaft body having a radial shaft and a thrust shaft, the radial shaft having a plurality of dynamic pressure generating grooves being formed on an shaft surface for gathering fluid to generate a dynamic pressure in a radial direction of the shaft body, the thrust shaft having a plurality of dynamic pressure generating grooves being formed on an shaft end face for gathering fluid to generate a dynamic pressure in an axial direction of the shaft body and the shaft body being rotated in a specified direction with the fluid made flow in the dynamic pressure generating grooves; and a shaft supporting member having a radial bearing section and a thrust bearing section, the radial bearing section supporting the radial shaft with a specified clearance being created between the shaft surface of the radial shaft and an inner wall of the radial bearing section, and the thrust bearing section supporting the thrust shaft with a specified clearance being created between the shaft end face and an inner wall of the thrust bearing section and between the shaft surface of the thrust shaft and an inner wall of the radial shaft supporting section, the improvement comprising the steps of:

forming a plurality of dynamic pressure generating grooves also on the shaft surface of the thrust shaft; and driving the shaft body so that a plurality of dynamic pressure generating grooves formed on the shaft surface of the thrust shaft generate a dynamic pressure applied also in a radial direction.

10. The method of driving a hydraulic bearing motor according to claim 9, wherein, the shaft body driven so that the dynamic pressure generated in the radial direction between the thrust shaft and the inner wall of the thrust bearing section is equal to a pressure which can support whirling of the shaft body and magnitude of an applied load, and the dynamic pressure generated in the radial direction between the radial shaft and the inner wall of the radial bearing section is enough to avoid contact between the radial bearing section and the shaft body.

* * * * *